United States Patent Office 2,831,876
Patented Apr. 22, 1958

2,831,876
STEROIDS

Gilbert M. Shull, Huntington Station, and Donald A. Kita, Jackson Heights, N. Y., assignors to Chas. Pfizer & Co., Inc., Brooklyn, N. Y., a corporation of Delaware No Drawing. Application January 23, 1957
Serial No. 635,598

1 Claim. (Cl. 260—397.47)

This invention relates to the oxidation of steroid compounds by microbiological means. In particular, it is concerned with a novel $\Delta^{1,4}$-pregnadiene compound obtained by the dehydrogenation of certain 3-keto-4-unsaturated steroids by means of certain microorganisms or of oxidizing enzymes produced by these microorganisms.

This application is a continuation-in-part of applications Serial Number 276,678, now abandoned, filed March 14, 1952, Serial Number 431,619, now abandoned, filed May 21, 1954, Serial Number 483,842, filed January 24, 1955, Serial Number 484,828, filed January 28, 1955, and Serial Number 524,817, filed July 27, 1955 by Gilbert M. Shull et al.

As is disclosed in the above mentioned applications, by subjecting a 3-keto-4-unsaturated steroid to the action of a species of the genus Mycobacterium, there is produced a compound which is a 3-keto-1,4-unsaturated steroid. Some nuclear oxygenation also may take place, chiefly in the 14 position when this position is available. The main product of the oxidation, however, is the dehydrogenation product. It is thus possible by the use of organisms of the genus Mycobacterium to produce compounds having a 3-keto group and unsaturated at the 1 and 4 positions. The contacting of a suitable steroid reactant with the oxidizing activity of a species of the genus Mycobacterium may be carried out by bringing the chosen steroid in aqueous solution or suspension into contact either with an actively growing culture of Mycobacterium or with cells of Mycobacterium removed from the growing culture and suspended in a suitable medium, or by contacting the steroid with extracts of oxidizing enzymes obtained from the culture of a species of the genus Mycobacterium.

In carrying out this process, various species of the genus Mycobacterium may be used. These are available from public culture collections, for example the American Type Culture Collection of Washington, D. C. These include known species such as Mycobacterium species 607, M. berolinense, M. lacticola, M. thamnopheos, and the species M. smegmatis ATCC 101. Particularly useful are organisms of the species M. phlei, a living culture of which has been deposited with the American Type Culture Collection of Washington, D. C., where it has been given the number ATCC 354. The various species of Mycobacterium vary considerably in the speed and ease with which dehydrogenation is produced by the cells of the organisms or by products formed during their growth. It has been found that certain strains of M. phlei and M. smegmatis are particularly active in bringing about the reaction of this invention. The various mycobacteria vary somewhat in their requirements for nutritional media. By a minium of simple testing, however, it is possible to determine the composition of suitable media, as well as the optimum conditions for operation, such as pH, rate of aeration, rate of stirring and so forth. In a like manner, the optimum conditions for the dehydrogenation of a particular steroid may be found.

As shown in the aforesaid parent applications, there are several procedures which may be used in the dehydrogenation of the steroid compounds. According to one preferred method, nutrient media are seeded from slants of the selected Mycobacterium. Such a medium may consist, for instance, of a mixture of a standard bacteriological nutrient broth base, together with glycerol. It has been found that a neutral, surface-active agent, such as a polyoxyethylene derivative of a sugar alcohol-fatty acid ester (e. g. Tween 80), when added in a minor proportion to the medium, is helpful. The addition of the amino acid, asparagine, is also helpful. The cultivation of mycobacteria has been described in considerable detail in many publications. The seeded, sterile, nutrient solutions may be grown in shake flasks for two to three days to provide inoculum for larger vessels, and in turn, the larger, stirred, aerated vessels may be used for the inoculation of full production-scale vessels for submerged fermentation. Considerable variation may, of course, be made in the medium. In general there is required a carbohydrate, a source of organic nitrogen, mineral salts and various trace metals. The 3-keto-4-unsaturated steroid reactant is then added to the actively growing Mycobacterium culture, and fermentation continued for from one to several days.

The products of the new method may then be isolated by extraction with various water-immiscible organic solvents. Lower halogenated hydrocarbons, such as chloroform, are particularly useful. After extraction, the solvent may be removed by distillation and the solid product recovered. This material may be further purified by recrystallization procedures from organic solvents or by chromatography, for instance on alumina columns or on other suitable solid absorbent materials. The use of a silica gel-ethanol column with a 98% to 2% by volume mixture of methylene chloride and ethanol (95%) as a developer has been found particularly advantageous. Methods for the separation of products of this nature have been reported previously in the literature. For some uses the products need not be separated, but the crude mixture may be used as such. It has been found advantageous in some cases to acylate the crude products and work with the resulting esters which are somewhat more stable.

By this process a valuable new compound has been obtained: $\Delta^1$-dehydro-14$\alpha$-hydroxy compound S or $\Delta^{1,4}$-pregnadiene-14$\alpha$,17$\alpha$,21-triol-3,20-dione. This product has particular utility as an intermediate in the preparation of the important cortical hormones, $\Delta^1$-dehydro-14$\alpha$-hydroxy compound F. For instance, the $\Delta^{1,4}$-pregnadiene-14$\alpha$,17$\alpha$,21-triol-3,20-dione may simply be subjected to oxygenation with the organism Curvularia lunata, according to the method of U. S. 2,658,023, issued November 3, 1953, to Gilbert M. Shull et al., whereby the desired 11$\beta$-hydroxyl substituent is introduced. Alternatively the new compound when treated with p-toluenesulfonic acid in benzene is dehydrated to the $\Delta^{14}$-dehydro compound. This when treated by the process of U. S. Patent 2,658,023 is converted to $\Delta^{1,14}$-bisdehydrohydrocortisone which is an active anti-inflammatory agent.

The following example is given by way of illustration, only, and not by way of limitation of this invention, since many apparently widely different embodiments of the invention may be made without departing from the spirit and scope hereof.

Example

The steroid reactant employed was 14$\alpha$-hydroxy-compound S, which may also be called 14$\alpha$,17$\alpha$,21-trihydroxy-$\Delta^4$-pregnene-3,20-dione. It is a white crystalline compound and has the following physical constants: M. P. 226°–228° C., and optical rotation $$[\alpha]_D^{acetone} + 129.6°$$

*Analysis.*—C, 69.64; H, 8.30, calculated for $C_{21}H_{30}O_5$; C, 69.57; H, 8.35.

*Mycobacterium smegmatis* ATCC 361 was transferred from a nutrient agar slant to seven Fernbach flasks each of which contained 1000 cc. of the following medium:

| | G. |
|---|---|
| Malt extract (Difco) | 5.0 |
| Dextrose hydrate | 30.0 |
| $NaNO_3$ | 2.0 |
| $KH_2PO_4$ | 1.0 |
| KCl | 0.5 |
| $MgSO_4.7H_2O$ | 0.5 |
| $FeSO_4.7H_2O$ | 0.5 | pH 6.7.
Tap $H_2O$ to 1000 cc.

After 5 days' shaking at 28° C., 250 mg. of the 14α-hydroxy-compound S were added to each flask. After an additional 3 days of shaking at 28° C., the fermentations were stopped and the broth extracted three times with an equal volume each of $CHCl_3$. The combined extracts were concentrated to a small volume and chromatographed on silica gel to yield 33 mg. of a white crystalline product, M. P. 217–218°, $[\alpha]_D + 132°$ ($CHCl_3$), $$\lambda_{max}^{H_2SO_4}\ 289,\ 315,\ 468,\ 520\ m\mu$$

The compound was identified as $\Delta^{1,4}$-pregnadiene-14α,17α,21-triol-3,20-dione.

What is claimed is:
$\Delta^{1,4}$-pregnadiene-14α,17α,21-triol-3,20-dione.

No references cited.